US006568635B2

(12) United States Patent
Carpenter

(10) Patent No.: US 6,568,635 B2
(45) Date of Patent: May 27, 2003

(54) APPARATUS AND METHOD FOR FLIGHT CONTROL OF AN AIRCRAFT

(75) Inventor: Billy R. Carpenter, Springtown, TX (US)

(73) Assignee: Lockheed Martin Corporation, Bethesda, MA (US)

( * ) Notice: Subject to any disclaimer, the term of this patent is extended or adjusted under 35 U.S.C. 154(b) by 0 days.

(21) Appl. No.: 09/898,631

(22) Filed: Jul. 2, 2001

(65) Prior Publication Data

US 2003/0001046 A1 Jan. 2, 2003

(51) Int. Cl.$^7$ ............................................ B64C 29/00
(52) U.S. Cl. ........................ 244/82; 244/23 A; 244/12.5
(58) Field of Search ..................... 244/82, 12.2, 12.4, 244/12.5, 12.6, 17.25, 23 C, 23 B, 23 A, 208, 209, 138 A

(56) References Cited

U.S. PATENT DOCUMENTS

| | | | |
|---|---|---|---|
| 3,018,034 A | * 1/1962 | Ferri | 244/12.3 |
| 3,093,350 A | * 6/1963 | Wilkins | 244/203 |
| 3,276,723 A | * 10/1966 | Miller et al. | 244/12.2 |
| 3,330,500 A | * 7/1967 | Winborn | 244/12.5 |
| 3,568,955 A | * 3/1971 | McDevitt | 244/23 C |
| 4,050,631 A | * 9/1977 | Syltebo | 239/265.25 |
| 4,301,980 A | * 11/1981 | Bradfield et al. | 244/12.5 |
| 4,505,443 A | 3/1985 | Bradfield et al. | 244/12.5 |
| 4,948,072 A | * 8/1990 | Garland et al. | 239/265.25 |
| 5,170,963 A | * 12/1992 | Beck, Jr. | 244/12.2 |
| 5,203,521 A | * 4/1993 | Day | 244/12.2 |
| 5,209,428 A | * 5/1993 | Bevilaqua et al. | 244/12.3 |
| 5,720,453 A | * 2/1998 | Platt | 239/265.19 |
| 5,779,169 A | * 7/1998 | Sloan | 239/265.25 |
| 6,382,560 B1 | * 5/2002 | Ow | 244/12.2 |

* cited by examiner

Primary Examiner—Charles T. Jordan
Assistant Examiner—Stephen A Holzen
(74) Attorney, Agent, or Firm—Bracewell & Patterson, L.L.P.

(57) ABSTRACT

An apparatus and method for flight control of an aircraft provides a body with adjustable intake ports ducting air into an internal intake manifold. Adjusting the openings of the intake ports changes the amount of air flowing over the surfaces surrounding the intakes, changing the amount of lift created by those surfaces. The intake manifold feeds air to at least one engine, and an exhaust manifold communicates the exhaust of the engine to exhaust exit ports. The exhaust manifold contains a plurality of moveable components that direct exhaust within the exhaust manifold and to particular exhaust exit ports for producing various levels of force imbalance among the exit ports. A compressor powered by the engine provides air to bleed-air ports on the wings. Varying lift on the forward surfaces with the intake ports, vectored exhaust, and bleed air are used to control and stabilize the aircraft during flight, obviating the need for aerodynamic control surfaces.

20 Claims, 4 Drawing Sheets

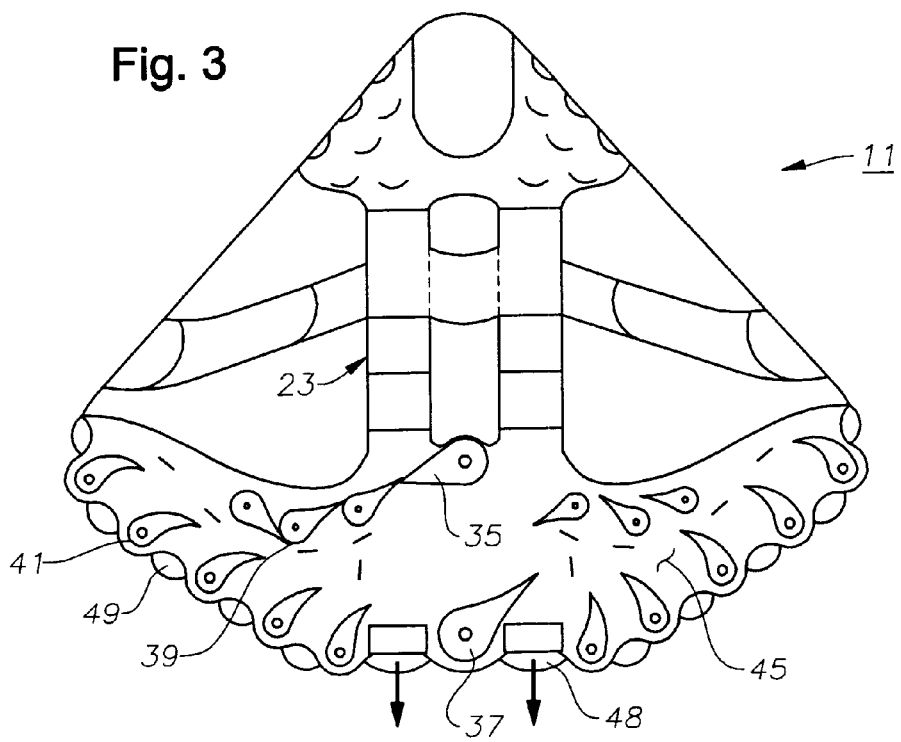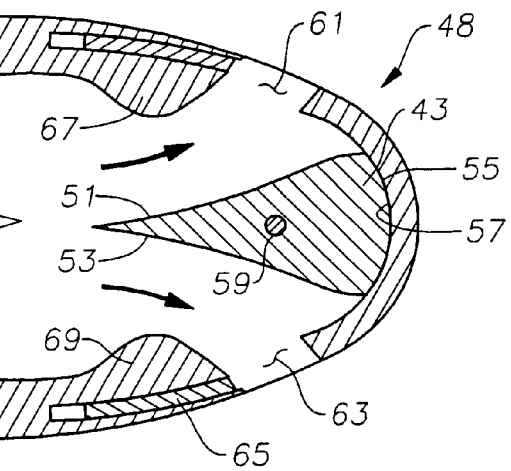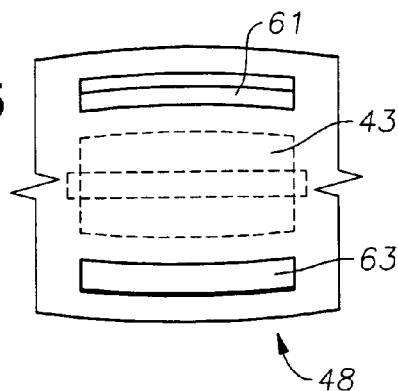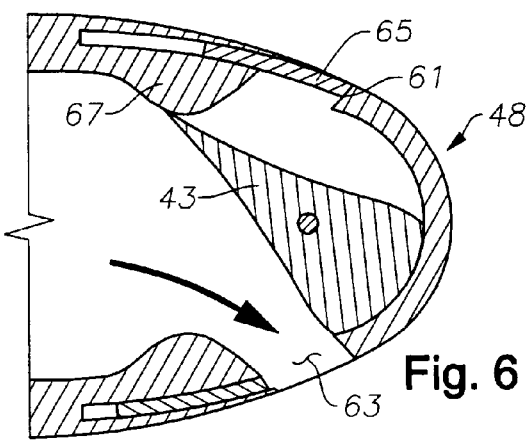

APPARATUS AND METHOD FOR FLIGHT CONTROL OF AN AIRCRAFT

BACKGROUND OF THE INVENTION

1. Field of the Invention

This invention generally relates to aircraft and particularly relates to flight control of aircraft without external, aerodynamic control surfaces.

2. Description of the Prior Art

In a typical aircraft, moveable aerodynamic control surfaces are installed on wings or other portions of the aircraft that are exposed to the airflow during flight. These control surfaces are moveable relative to the aircraft and include, for example, ailerons, trim tabs, canards, and rudders. These surfaces use aerodynamic effects to cause moments in the yaw, pitch, and roll directions for controlling the orientation of the aircraft or for stabilizing the aircraft during flight. Moveable, external control surfaces are complicated, requiring many parts and adding to the weight of the aircraft. Another characteristic of external control surfaces which may be undesirable is that they create drag in operation. Also, the radar cross-section of an aircraft increases when the control surfaces are displaced from their nominal positions, reducing the stealth characteristics of the aircraft.

Modern aircraft advances include vectored thrust and internal engines. Vectored thrust is used in vertical takeoff and landing (VTOL) or short-takeoff and vertical landing (STOVL) applications and for producing quicker maneuvers or allowing steeper angles of attack. Thrust vectoring is done externally, generally by using a rotating or articulating nozzle.

In some military applications, engines are installed deep within the body of the aircraft. Though this tends to reduce the external heat signature and reduce the exposed surfaces that would increase the radar cross-section of the aircraft, it is more difficult to implement thrust vectoring.

SUMMARY OF THE INVENTION

An apparatus and method for flight control of an aircraft provides a body with adjustable intake ports ducting air into an internal intake manifold. Adjusting the openings of the intake ports changes the amount of air flowing over the surfaces surrounding the intakes, changing the amount of lift created by those surfaces. The intake manifold feeds air to at least one engine, and an exhaust manifold communicates the exhaust of the engine to exhaust exit ports. The exhaust manifold contains a plurality of moveable components that direct exhaust within the exhaust manifold and to particular exhaust exit ports for producing various levels of force imbalance among the exit ports. A compressor powered by the engine provides air to bleed-air ports on the wings for creating roll moments. Varying lift on the forward surfaces with the intake ports, vectored exhaust, and bleed air are used to control and stabilize the aircraft during flight, obviating the need for aerodynamic control surfaces.

DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

FIG. 3 is a top view of the aircraft in FIG. 1 showing the components in a third orientation.

FIG. 4 is a sectional view of the rear portion of the aircraft of FIG. 1.

FIG. 5 is a rear view of the rear portion of the aircraft of FIG. 1.

FIG. 6 is a sectional view of the rear portion of the aircraft of FIG. 1 showing the components in a second orientation.

DETAILED DESCRIPTION OF THE INVENTION

Figure 1:
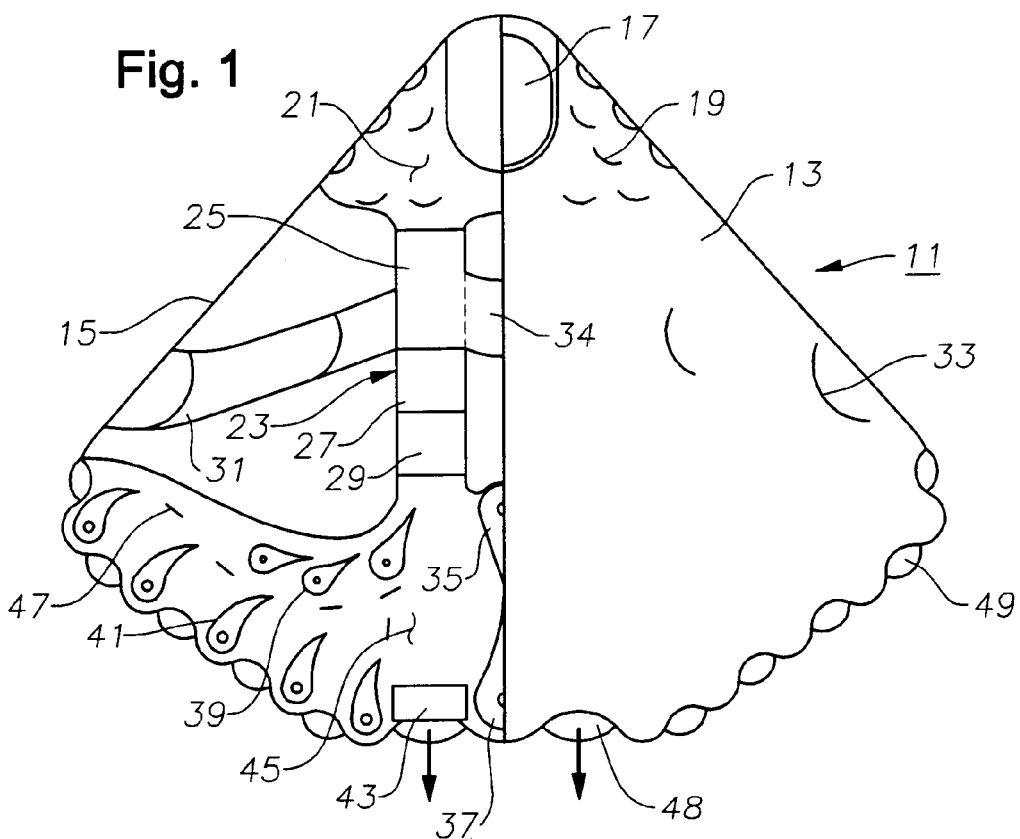
FIG. 1 is a top view of an aircraft constructed in accordance with the present invention.

Referring to FIG. 1, aircraft 11 has a diamond-shaped body and integrated wings with no external aerodynamic flight control surfaces. The right side of the figure shows the upper exterior of aircraft 11, whereas the left side of the figure shows the upper surface 13 removed, exposing the inner portion of lower surface 15 and the internal components. A cockpit 17 is located in the front portion of aircraft 11 for containing a pilot. Alternatively, aircraft 11 may be an unmanned aerial vehicle (UAV), in which the cockpit 17 may contain computers for controlling aircraft 11 and payload, or the computers maybe located elsewhere in aircraft 11, obviating the need for cockpit 17.

Air intake ports 19 are positioned to either side of cockpit 17 and on upper surface 13 and on lower surface 15. For each surface, the number of intake ports 19 on each side of cockpit 17 is equal, though the number of intake ports 19 on surfaces 13, 15 may differ. Also, the number and size of intake ports 19 may differ for various aircraft configurations and sizes. Each intake port 19 has a sliding door (not shown), like those shown in FIGS. 4 through 8, for modulating the amount of airflow entering intake port 19 and passing into an intake manifold 21 located in the forward section of aircraft 11. By modulating the amount of airflow entering intake ports 19, the remaining airflow over surfaces 13, 15 is altered, changing the amount of drag and lift created by surfaces 13, 15 and causing pitch moments to develop. These pitch moments cause aircraft 11 to move toward a nose-down or nose-up attitude. For example, restricting air entering the intake ports 19 on lower surface 15 causes more air to travel over lower surface 15, creating more lift on lower surface 15. This lift creates a pitch moment, tending to cause the nose of aircraft 11 to move downward. Closing ports on one side of upper surface 13 and the opposite side of the lower surface 15 produces a roll moment, the side of upper surface 13 with the closed ports tending to move upward, the opposite side of lower surface 15 tending to move downward.

Intake manifold 21 provides intake air to one or more engines, which, in multiple engine configurations, may be spaced apart and equidistant from the longitudinal centerline. Air in intake manifold 21 divides and passes into two engines 23, the axes of engines 23 being oriented longitudinally and offset to either side of the longitudinal centerline of aircraft 11. The air first enters a compressor 25, preferably oversized, which pressurizes the air using rotating, bladed fans (not shown), then passes into a combustion section 27. Fuel is added to the pressurized air, and the mixture is ignited to produce a rearward-directed exhaust of hot gases. These gases pass through bladed rotors (not shown) in a turbine section 29, causing the rotors to rotate. The fans and the rotors are attached to a shaft (not shown) passing through engine. As the gases cause the rotors to rotate, the shaft rotates, causing the fans in compressor 25 to rotate for pressurizing the air entering engine.

Air from each compressor 25 can also pass laterally into a bleed-air manifold 31 leading to bleed-airports 33 on surfaces 13, 15 and into a crossover passage 34 connecting manifold 31. Two sets of two bleed-air ports are located on each surface 13, 15, and each set is laterally located equidistant from and on opposite sides of the longitudinal centerline of aircraft. Because bleed-air ports are located away from the centerline, air passing out of bleed-airports 33 creates roll moments, tending to cause aircraft 11 to rotate about a longitudinal line. For example, air passing out of the bleed-air ports 33 on the right side of lower surface 15 creates a roll moment tending to cause the right side of aircraft 11 to move upward. Each port also has a sliding door, like those shown in FIGS. 4 through 8, for covering the ports 33 and controlling the amount of bleed air passing through ports 33.

Figure 2:
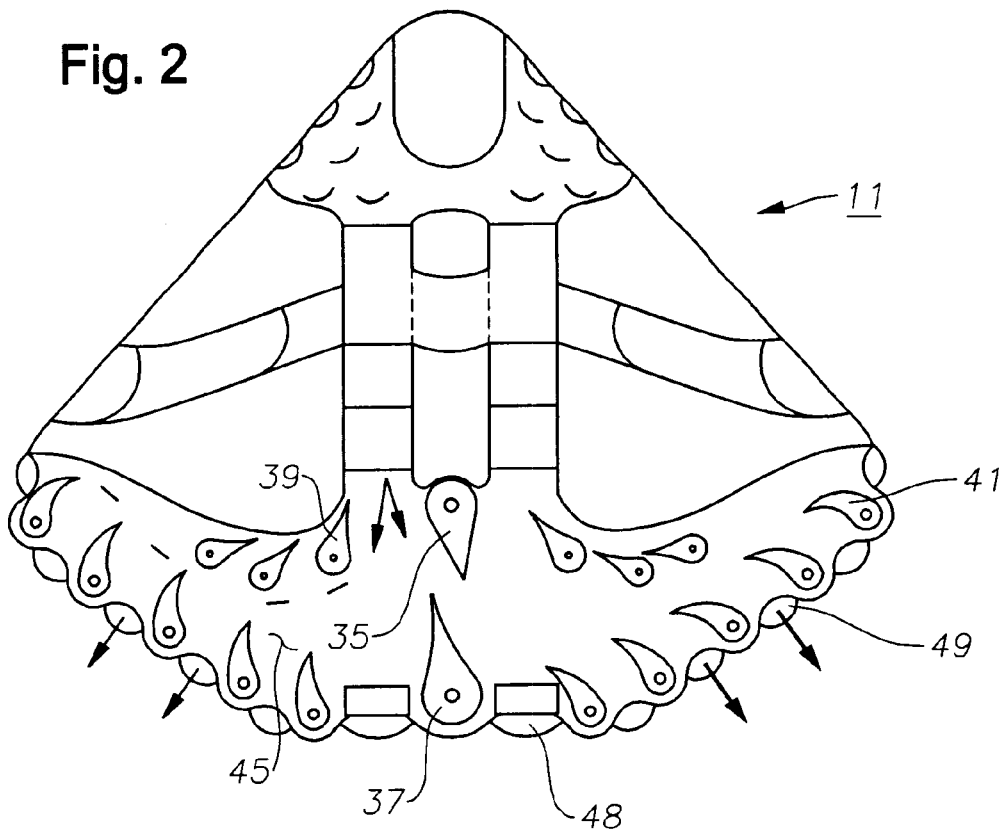
FIG. 2 is a top view of the aircraft in FIG. 1 showing the components in a second orientation.

Adjustable vanes 35, 37, 39, 41 and wedges 43 are located within an exhaust manifold 45 for vectoring exhaust exiting from turbines 29. The left side of FIG. 1 and FIGS. 2 and 3 show the forward primary vane 35, rear primary vane 37, secondary vanes 39, left and right trailing edge vanes 41, and exhaust wedges 43. Forward primary vane 35 is between and immediately behind the exhaust exits of engines 25, whereas rear primary vane 37 is located at the rear of the exhaust manifold directly behind vane 35. Vanes 35, 37 are bisected by a vertical plane passing through the central longitudinal axis of aircraft 11. Two sets of secondary vanes 39, one set being on each side of aircraft 11, each comprise inner, middle and outer vanes 39. Trailing edge vanes 41 are located along the trailing edges of aircraft 11, downstream of primary vane 35 and secondary vanes 39. Vanes 35,37,39,41 pivot on vertical axes, whereas wedges 43 pivot on a horizontal axes. Primary vanes 35, 37 and secondary vanes 39 have a symmetric, teardrop-shaped horizontal cross-section with a rounded end and a tip. Trailing edge vanes 41 have a curved, airfoil-shaped horizontal cross-section and also have a rounded end and a tip. Wedges 43 have a shape as shown in FIGS. 4 through 8. The tips of vanes 37, 39, 41 are pointed upstream (toward the engines 23), whereas the tip of primary vane 35 points downstream. Manifold 45 also has fixed vanes 47 which direct airflow and provide structural support for manifold 45. Though not shown, excess bleed air from bleed-air manifold 31 can be vented rearward along surfaces 13, 15 over exhaust manifold to cool surfaces 13, 15 and further reduce the heat signature of aircraft 11.

FIG. 1 depicts vanes 35, 37, 39, 41 in their orientation for forward flight with both engines 23 operating properly. Tips of primary vanes 35, 37 are oriented to bring their tips into alignment, wherein the tips are as near as possible to each other and are along the vertical plane passing through the longitudinal centerline. This orientation allows much of the exhaust from engines 23 to pass directly to primary exit ports 48, causing a forward force on aircraft 11, ports 48 being located to the rear of and on each side of rear primary vane 37. Primary ports 48 have an opening on each surface 13,15, as shown in FIGS. 4 through 8. Secondary vanes 39 are rotated to divert some of the exhaust exiting engines 23 toward trailing edge vanes 41, and trailing edge vanes 41 are rotated to redirect the exhaust out of trailing edge ports 49. Trailing edge ports 49 are located to each side of trailing edge vanes 41, ports 49 comprising an opening on upper surface 13 and an opening on lower surface 15, each opening having a door (not shown), like those for intake ports 19, for closing each opening on each port 49. Corresponding vanes 39, 41 on both sides of aircraft 11 have the same orientation during normal forward flight. Because the exhaust exiting trailing edge ports 49 is exiting at an angle relative to the longitudinal axis of aircraft 11, the longitudinal vector component provides additional forward thrust, and the lateral component provides yaw stabilization of aircraft 11. To cool the exhaust exiting ports 48, 49, excess bleed air may also be vented around ports 48, 49 to reduce the infrared signature of the exhaust.

The orientation of vanes 35, 37, 39, 41 for left yaw is shown in FIG. 2. Aircraft 11 yaws when a moment is created by more exhaust being directed out of trailing edge ports 49 on one side of aircraft 11 than out of ports on the other side. To direct more exhaust out of trailing edge ports 49 on the right side, as shown in the figure, secondary vanes 39 on the left side are rotated to restrict exhaust from passing forward of vanes 39, causing more exhaust to pass into the center of manifold 45. The tips of all trailing edge vanes 41 are rotated to the left to allow more exhaust to exit trailing edge ports 49 at greater angles relative to the longitudinal axis. The tip of forward primary vane 35 is rotated to the right side, causing more exhaust from the right engine to be diverted away from right primary exit port 48 and toward right trailing edge ports 49. Likewise, the tip of rear primary vane 37 is rotated to the left, diverting more exhaust from the left engine to the right portion of manifold 45 and away from left trailing edge ports 49. The thrust imbalance between the trailing edge ports 49 causes the nose of aircraft 11 to rotate to the left. To cause the nose to yaw to the right, the orientations of vanes 35, 37, 39, 41 are moved to positions that are the mirror of those of vanes 35, 37, 39, 41 in a left yaw orientation.

A serious situation occurs when one of engines 23 is not operating, causing an imbalance in the amount of exhaust in the two sides of the exhaust manifold 45. FIG. 3 depicts the orientation of vanes 35,37,39,41 when thrust from only one engine is available. In this instance, only the right engine is operating, and thrust must be provided throughout exhaust manifold 45 to prevent aircraft 11 from uncontrollably yawing to the left.

To prevent exhaust of the right engine from passing forward through left engine, the tip of forward primary vane 35 is rotated to the left, and the inner left secondary vane 39 is rotated so that its tip is near the tip of forward primary vane 35. The tip of forward primary vane 35 is rotated to the left for a much greater angle than is used during yaw maneuvers. The middle secondary vane 39 is rotated to position its tip near the rounded, downstream end of inner secondary vane 39, and outer secondary vane 39 is rotated to position its edge near the rounded, downstream end of the middle secondary vane 39. Vanes 39 act as a block, preventing exhaust from passing out of exhaust manifold 45 and forward through left engine. The tip of rear primary vane 37 is also rotated for a much greater angle than in yaw maneuvers, but to the right. Much of the exhaust moving toward the right primary exit port 48 is diverted by rear primary vane 37 toward the left side of exhaust manifold 45. The inner, right-hand secondary vane 39 is positioned to divert exhaust from the right side of exhaust manifold 45, working together with rear primary vane 37 for this purpose.

FIGS. 4 through 8 show details of one of the movable exhaust wedges 43 located at the primary exit ports 48 and shown in FIGS. 1 through 3. Exhaust wedge 43 has an upper surface 51 and a lower surface 53, each being concave in longitudinal cross-section, convex in lateral cross-section, and converging to an edge at the forward end of exhaust wedge 43. The rear surface 55 of wedge 43 is in sliding contact with the inner surface 57 of the rear outer wall of aircraft 11. Exhaust wedge 43 rotates about a horizontal axis 59 for moving the tip of each exhaust wedge 43 up or down to control the amount of exhaust directed through an upper opening 61 and a lower opening 63 of each primary exit port 48. Each opening 61, 63 has a sliding door 65 for covering opening 61, 63 when exhaust wedge 43 is moved to a position that seals one of the openings 61, 63, though only one opening 61, 63 can be sealed at a time. FIGS. 4 and 5 show exhaust wedge 43 in the forward flight position and doors 65 in their retracted positions. Exhaust exits both openings 61, 63, providing forward thrust and vertical thrust vector components, the vertical thrust component assisting in pitch control and stability of aircraft 11.

To cause the maximum downward pitch moment (for quickly rotating the nose of aircraft 11 downward), the tip of exhaust wedge 43 is rotated upward, as shown in FIG. 6. Upper surface 51 near the leading end contacts a protrusion 67 on the upper inner surface of primary exit port 48 to seal upper opening 61, preventing exhaust from exiting upper opening 61. Door 65 for upper opening 61 is closed. The intersection of lower surface 53 and rear surface 55 aligns with the rear portion of lower opening 63, causing all exhaust to be directed to lower opening 63, door 65 being completely retracted. The imbalance of force due to exhaust passing through lower opening 63 without an opposing force through upper opening 61 causes a pitch moment, tending to cause the rear of aircraft 11 to move upward. This positioning of exhaust wedges 43 may also be used in a VTOL aircraft to provide some forward thrust, while also assisting in upward thrust.

Figure 7:
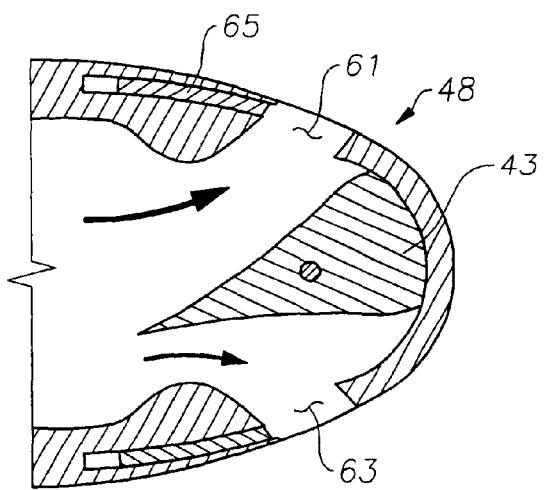
FIG. 7 is a sectional view of the rear portion of the aircraft of FIG. 1 showing the components in a third orientation.
Figure 8:
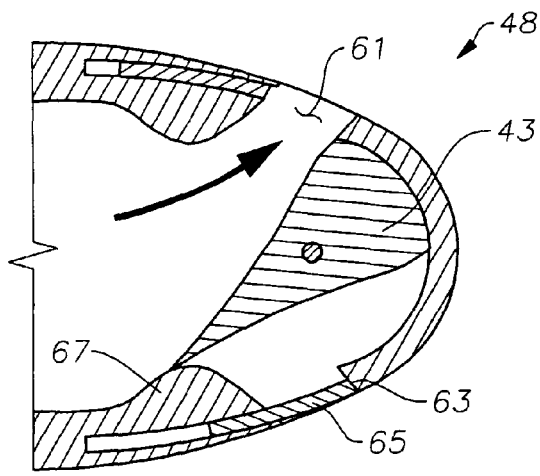
FIG. 8 is a sectional view of the rear portion of the aircraft of FIG. 1 showing the components in a fourth orientation.

FIG. 7 shows exhaust wedge 43 in an upward-pitch orientation for causing the nose of aircraft 11 to pitch upward. Wedge 43 is rotated to position the leading end near a protrusion 69 on the lower inner surface of primary exit port 48, diverting more exhaust toward upper opening 61 than in forward flight (FIG. 4). This causes an imbalance in thrust between openings 61, 63, causing a moment tending to rotate the rear of aircraft 11 downward, pitching the nose of aircraft 11 upward. Exhaust wedges 43 can be rotated to seal the lower opening 63, as described above for upper opening 61, as shown in FIG. 8. Upper surface 51 of exhaust wedge 43 is in contact with protrusion 69, providing maximum force to pitch the nose upward.

Referring to the FIGS. 1 through 8, in operation, a pilot or computer controls the flight of aircraft 11 from cockpit 17. Air for engines 23 flows into intake manifold 21 through the open doors on intake ports 19. In level flight, the doors for the intake ports 19 on each side of the cockpit 17 will be open the same amount, though the doors on the upper surface 13 may be open a different amount than those on the lower surface 15. The intake doors may be fully open or may be partially closed. Air travels from intake manifold 21 into compressor sections 25 of engine 23, where the air is pressurized. A portion of the air is ducted to bleed-air ports 33 on the upper and lower surface 15 of wings. Bleed air may be released during normal, level flight to endure roll stability of aircraft 11. Thrust is produced when exhaust passes rearward from the turbine sections 29 of engines 23, into exhaust manifold 45, and exits aircraft 11. Exhaust exits out of aircraft 11 through primary exit ports 48 and trailing edge ports 49, the amount of exhaust being equal on both sides of aircraft 11 for straight and level flight.

To perform a roll maneuver in which the right wing move downward, the doors of intake ports 19 on the upper left and lower right portions of aircraft 11 are closed, producing greater lift on the surfaces 13, 15 surrounding these intake ports 19. Additionally, bleed air is released from the upper right and lower left bleed-air ports 33. The combination of the increased lift and bleed air cause aircraft 11 to roll, the right wing moving downward. Only one of the forces are needed to roll aircraft 11, but using all of the available force sources causes a higher roll rate.

To yaw aircraft 11, primary vanes 35, 37 rotate in opposite directions to divert exhaust from on side of exhaust manifold 45 to the other side and from one primary exhaust exit 48 to the other exit 48. Secondary vanes 39 rotate to positions which prevent exhaust from passing forward of vanes 39 on the side where less thrust is desired. Trailing edge vanes 41 also rotate to change the direction that trust moves out of trailing edge ports 49. The combination of the orientation of vanes 35, 37, 39, 41 causes a larger amount of exhaust to exit on one side of aircraft 11, causing aircraft 11 to rotate about a vertical axis, the nose moving to the side opposite the larger thrust.

Pitch is induced through changes in lift at intake ports 19 and through changes in the orientation of exhaust wedge 43 at primary exit ports 48. As described above for causing roll, the doors on intake ports 19 can be closed to produce more lift on the surrounding surface. When the intake doors on either the upper or lower surface 15 are closed, a lift force is created on that surface, causing the nose to move in the direction of that surface. Also, exhaust wedges 43 move to direct more or less flow out of upper opening 61 or lower opening 63 at the primary exit ports 48. For example, as more exhaust is passed out of upper opening 61, the nose of aircraft 11 pitches upward.

Figure 9:
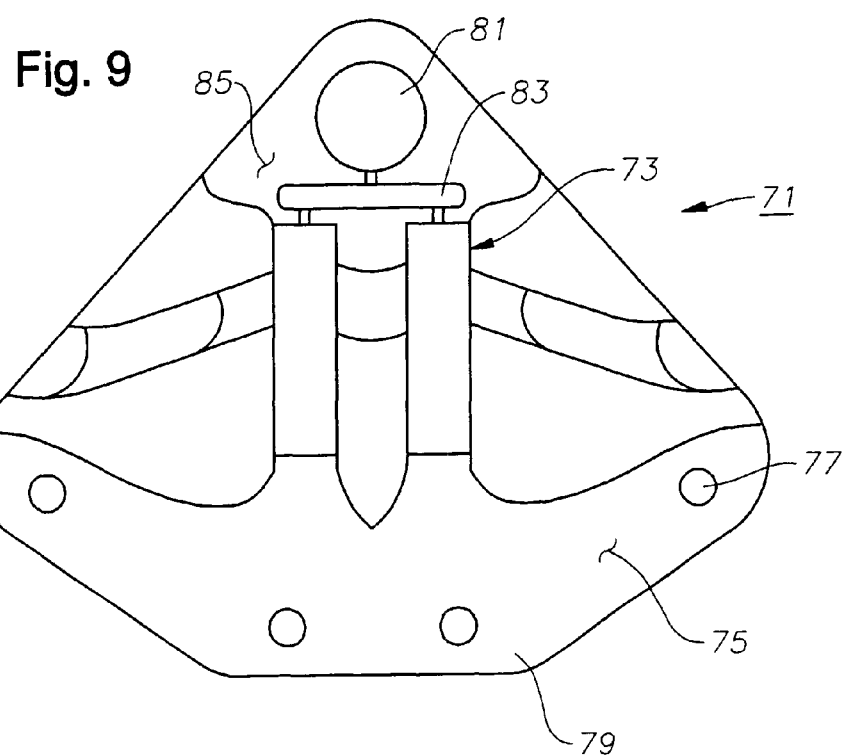
FIG. 9 is a top view of a second embodiment of an aircraft constructed in accordance with the present invention, the aircraft being a VTOL or STOVL configuration.
Figure 10:
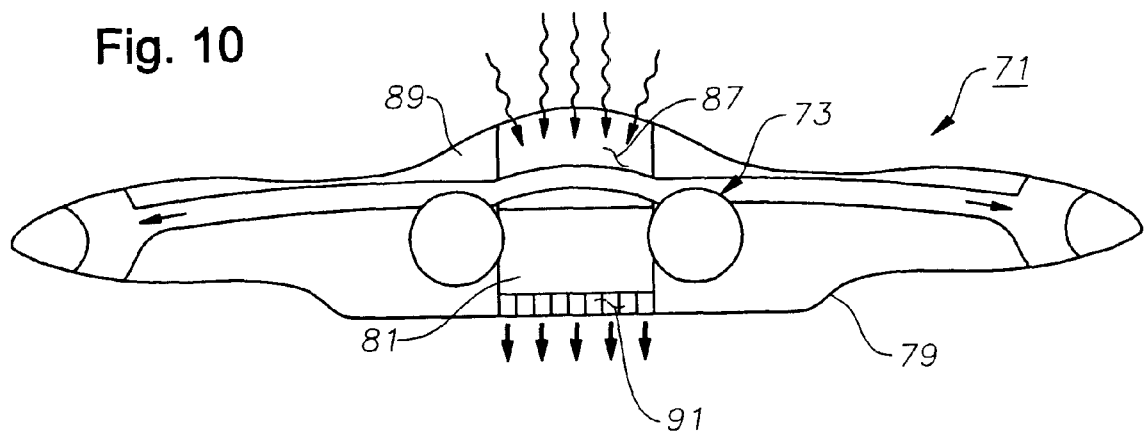
FIG. 10 is a front view of the aircraft of FIG. 9.

An optional embodiment for the internal ducting of exhaust is shown in FIGS. 9 and 10. A vertical takeoff and landing (VTOL) aircraft 71 is shown in the figures. Aircraft 71 has two engines 73 which feed exhaust into an exhaust manifold 75. Exhaust manifold 75 has moveable, internal vanes like those shown in FIGS. 1 through 3 and four exhaust ports 77 in the lower surface 79 of aircraft 71. Ports 77 direct exhaust downward to lift the rear portion of aircraft 71, ports 77 having sliding doors (not shown) for closing ports 77. A gear-driven, ducted lift fan 81 is located in the forward portion of aircraft 71 for providing additional upward thrust. A gear box 83 located forward of engines 73 transfers torque from engines 73 to lift fan 81. The air for lift fan 81 is not in communication with intake manifold 85; the air is drawn from above aircraft 71 through an opening 87 in upper surface 89, as shown in FIG. 10. The air passes through lift fan 81 and exits aircraft 71 through an opening 91 (FIG. 10) in lower surface 79.

Figure 11:
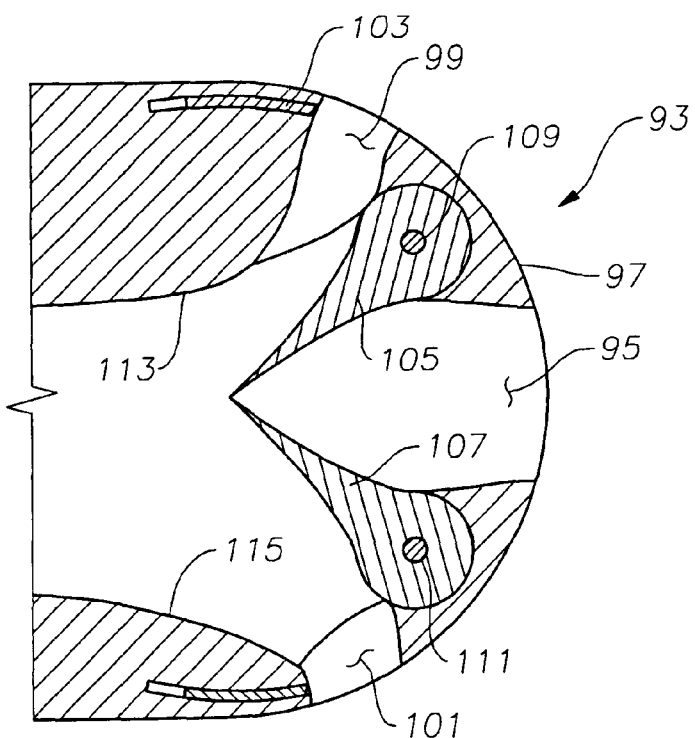
FIG. 11 is a sectional view of a second embodiment of the rear portion of the aircraft of FIG. 1.

An alternate embodiment of a primary exit port 93 is depicted in FIG. 11. A center exhaust port 95 is located in the rear surface 97 and near the vertical center of the aircraft. An upper opening 99 and a lower opening 101 are positioned adjacent to center exhaust port 95, each opening 99, 101 having a sliding door 103 near the outer surface of aircraft 11. Between center exhaust port 95 and each opening 99, 101 is a moveable vane 105, 107, each rotating on a horizontal axis 109, 111. Vanes 105, 107 rotate between inner and outer positions, the leading ends of vanes 105, 107 being in contact when vanes 105, 107 are in their inner positions. Vanes 105, 107 are shown in the figure in their inner position, diverting exhaust to openings 99, 101 and preventing exhaust from exiting through center exhaust port 95. When upper vane 105 is in the inner position, upper vane 105 diverts exhaust upward toward upper opening 99. When upper vane 105 is in the outer position, exhaust passes to the center exhaust port 95 and is prevented from passing into upper opening 99, the inner end of which is covered by upper vane 105 as the leading end of vane 105 contacts an upper, inner surface 113 of exhaust manifold 45. Lower vane 107 operates in the same manner as upper vane 105, but lower vane 107 does not rotate to a position in which the tip of vane 107 contacts the lower, inner surface 115 of exhaust manifold 45. Instead, lower opening 101 always remains at least partially open, allowing exhaust to pass through lower opening 101.

The present invention allows an aircraft to be controlled in flight without the use of external aerodynamic control surfaces. The many advantages include reduced complexity and weight, reduced radar cross-section, reduced drag, and higher maneuver rates. Control of the aircraft when an engine is out is greatly improved by a means for balancing thrust between the left and right sides of the aircraft. Also, the various embodiments provide for VTOL capability with little or no changes to aircraft.

While the invention has been shown in only a few of its forms, it is not thus limited but is susceptible to various changes and modifications without departing from the spirit thereof.

I claim:

1. An aircraft, comprising:
   a body;
   an engine within the body;
   an exhaust manifold within the body and in communication with combustion exhaust produced by the engine;
   left and right exit ports spaced laterally from a longitudinal axis of the body and in communication with the exhaust manifold for discharging a portion of the combustion exhaust of the engine; and
   moveable components within the exhaust manifold for selectively varying the amount of combustion exhaust passing out of the left and right exit ports relative to each other for changing an orientation of the aircraft.

2. The aircraft of claim 1, wherein:
   the moveable components comprise at least one primary vane located near the longitudinal axis and being pivotally mounted for directing combustion exhaust selectively toward the left exit ports and toward the right exit ports.

3. The aircraft of claim 1, wherein:
   the moveable components comprise left and right vanes located near the left and right exit ports, respectively, the left and right vanes being pivotal to change the direction of the combustion exhaust passing out of the left and right exit ports, respectively.

4. The aircraft of claim 3, further comprising:
   at least one primary vane located near the longitudinal axis and being pivotally mounted for directing combustion exhaust selectively toward the left exit ports and toward the right exit ports; and
   left and right sets of secondary vanes located inboard of the left and right vanes, respectively, the left secondary vanes movable to divert varying amounts of combustion exhaust toward the left vanes, the right secondary vanes movable to divert varying amounts of combustion exhaust toward the right vanes.

5. The aircraft of claim 1, further comprising:
   at least one primary exit port; and
   a primary vane located upstream of the primary exit port and pivotal in left and right directions to vary the direction of the combustion exhaust passing out of the primary exit port.

6. The aircraft of claim 1, further comprising:
   upper and lower rear exit ports in communication with the exhaust manifold; and
   a moveable member located near the upper and lower rear exit ports, the moveable member varying the amount of combustion exhaust flowing through the upper and lower rear exit ports relative to each other to cause a nose of the aircraft to move up or down.

7. The aircraft of claim 1, further comprising:
   a compressor for compressing air;
   left and right bleed-air ports spaced laterally from the longitudinal axis of the body and located on at least one outer surface of the body, the bleed-air ports being in communication with the compressor for selectively discharging compressed air through the bleed-air ports to control orientation of the aircraft.

8. The aircraft of claim 7, further comprising:
   a closure member over each of the bleed-air ports for selectively opening and closing the bleed-air ports.

9. The aircraft of claim 7, further comprising:
   a crossover passage connecting the left and right bleed-air ports.

10. The aircraft of claim 1, further comprising:
    exhaust ports on a lower surface of the aircraft and in communication with the exhaust manifold for directing combustion exhaust from the engine in a generally-downward direction to cause the aircraft to move upward.

11. The aircraft of claim 1, further comprising:
    a closure member over each of the left and right exit ports for selectively opening and closing the left and right exit ports.

12. The aircraft of claim 1, further comprising:
    intake ports located on a forward surface of the aircraft for directing air to the engine;
    intake-port doors located near the intake ports, the intake-port doors moving from an open position, in which the intake ports are open, to a closed position, in which the intake ports are closed; and wherein
    moving the intake-port doors between the open and closed positions causes a change in an airflow over the forward surface, the change in airflow changing an amount of lift created by the forward surface.

13. An aircraft, comprising:
    a body;
    an engine within the body;
    a exhaust manifold within the body and in communication with exhaust produced by the engine;
    upper and lower exit ports spaced laterally to the left and to the right from a longitudinal axis of the body and in communication with the exhaust manifold for discharging a portion of the exhaust of the engine;
    left and right vanes located near the left and right exit ports, respectively, the left and right vanes being pivotal to change the direction of the exhaust passing out of the left and right exit ports, respectively;

at least one primary vane within the exhaust manifold, the primary vane being pivotally mounted for directing exhaust selectively toward the left exit ports and toward the right exit ports, the primary vane being located near the longitudinal axis;

left and right sets of secondary vanes located inboard of the left and right vanes, respectively, the left secondary vanes movable to divert varying amounts of exhaust toward the left vanes, the right secondary vanes movable to divert varying amounts of exhaust toward the right vanes; and a moveable member located near the upper and lower rear exit ports, the moveable member varying the amount of exhaust flowing through the upper and lower rear exit ports relative to each other to cause a nose of the aircraft to move up or down.

14. The aircraft of claim 13, further comprising:

a compressor powered by the engine for compressing air;

left and right bleed-air ports spaced laterally from the longitudinal axis of the body and located on at least one outer surface of the body, the bleed-air ports being in communication with the compressor;

a crossover passage connecting the left and right bleed-air ports;

a bleed-air blocking member located at each of the bleed-air ports; and wherein
compressed air from the compressor is selectively released from the bleed-air ports by opening and closing the bleed-air ports for causing the aircraft to roll to the left or to the right.

15. The aircraft of claim 13, further comprising:

a closure member over each of the left and right exit ports for selectively opening and closing the left and right exit ports.

16. The aircraft of claim 13, further comprising:

intake ports located on a forward surface of the aircraft for directing air to the engine; and intake-port doors located near the intake ports, the intake-port doors sliding from an open position, in which the intake ports are open, to a closed position, in which the intake ports are closed; and wherein
moving the intake-port doors between the open and closed positions causes a change in an airflow over the forward surface, the change in airflow changing an amount of lift created by the forward surface.

17. A method of controlling the flight of an aircraft, the method comprising:

(a) providing an aircraft having a body and an exhaust manifold within the body;

(b) passing combustion exhaust from at least one engine into the exhaust manifold;

(c) discharging the combustion exhaust from the exhaust manifold out of a plurality of exhaust ports; and (d) selectively moving components within the exhaust manifold to flow more combustion exhaust out of the exhaust ports on one side of a longitudinal axis than on the other side to change a direction of flight.

18. The method of claim 17, further comprising:

compressing air and releasing the compressed air through bleed-air ports on at least one surface of the aircraft to cause the aircraft to roll to the left or right.

19. The method of claim 17, further comprising:

delivering intake air to the engine through a plurality of intake ports; and altering the air flow over at least one exterior surface of the body by varying an amount of airflow into the intake ports relative to each other.

20. A method of controlling the flight of an aircraft, the method comprising:

(a) providing an aircraft having a body and an exhaust manifold within the body;

(b) passing exhaust from at least one engine into the exhaust manifold;

(c) discharging the exhaust from the exhaust manifold out of a plurality of exhaust ports; and (d) selectively moving components within the exhaust manifold to flow a different amount of exhaust out of exhaust ports on an upper surface than out of exhaust ports on a lower surface of the body to change a direction of flight.

* * * * *